United States Patent
Hang et al.

(10) Patent No.: US 11,581,811 B2
(45) Date of Patent: *Feb. 14, 2023

(54) MULTI-PHASE PARALLEL CONVERTER AND CONTROLLING METHOD THEREFOR

(71) Applicant: Silergy Semiconductor Technology (Hangzhou) LTD, ZheJiang Province (CN)

(72) Inventors: Kailang Hang, Zhejiang Province (CN); Liangwei Sun, Zhejiang Province (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 95 days.

This patent is subject to a terminal disclaimer.

(21) Appl. No.: 16/262,021

(22) Filed: Jan. 30, 2019

(65) Prior Publication Data
US 2019/0165680 A1    May 30, 2019

Related U.S. Application Data

(63) Continuation of application No. 14/967,798, filed on Dec. 14, 2015, now Pat. No. 10,263,524.

(30) Foreign Application Priority Data

Jan. 16, 2015    (CN) .......................... 201510021774.7

(51) Int. Cl.
*H02M 3/158* (2006.01)

(52) U.S. Cl.
CPC ................. *H02M 3/1584* (2013.01)

(58) Field of Classification Search
CPC .. H02M 3/156; H02M 3/1584; H02M 3/1586; H02M 2003/1586; H02M 3/158; H02M 1/32; H02M 1/081–084; H02M 3/1588; H02M 3/155; H02M 3/1582; H02M 3/157; H02M 3/1563; H02M 2003/1566; H02M 2003/1557; H02M 2001/0009; H02M 2001/385; H02M 2001/0012; H02M 3/02; H02M 3/04; H02M 3/10; H02M 3/135; H02M 3/137; H02M 3/139;
(Continued)

(56) References Cited

U.S. PATENT DOCUMENTS

6,094,038 A    7/2000 Lethellier
6,359,503 B1   3/2002 Alini et al.
(Continued)

*Primary Examiner* — Thienvu V Tran
*Assistant Examiner* — Carlos O Rivera-Perez (57) ABSTRACT

A multi-phase parallel converter can include: sampling circuits corresponding to power stage circuits to form a plurality of phases of the multi-phase parallel converter, where each sampling circuit samples an inductor current of a corresponding power stage circuit, and generates a sense signal; a current-sharing circuit that generates a current-sharing control signal according to a superimposed signal that is generated by adding the sense signal to a bias voltage signal; switching control circuits corresponding to the power stage circuits, where each switching control circuit receives the current-sharing control signal, and controls a switching operation of a corresponding power stage circuit; and a bias voltage generator that generates the bias voltage signal to gradually increase/decrease when a selected phase is to be disabled/enabled.

12 Claims, 6 Drawing Sheets

(58) Field of Classification Search
CPC ............ H02M 3/1552; H02M 3/1555; H02M 3/1566; H02M 1/0003; H02M 1/0009; H02M 1/0016; H02M 1/0019; H02M 1/0025; H02M 1/0032; H02M 1/0035; H02M 1/0041; H02M 1/0043; H02M 1/08; H02M 1/088; H02M 1/096; H02M 1/14; H02M 1/143; H02M 1/15; H02M 1/36; H04B 2215/069
USPC ........ 323/212–219, 237, 238, 271–275, 280, 323/282–285, 288, 351
See application file for complete search history.

(56) References Cited

U.S. PATENT DOCUMENTS

| | | | | |
|---|---|---|---|---|
| 6,806,689 | B2 * | 10/2004 | Schuellein | H02M 3/1584 323/272 |
| 7,583,128 | B1 | 9/2009 | Batarseh et al. | |
| 8,008,970 | B1 | 8/2011 | Homol et al. | |
| 8,525,497 | B2 * | 9/2013 | Chiu | G05F 1/618 323/272 |
| 9,225,264 | B1 | 12/2015 | Fedigan et al. | |
| 2009/0302820 | A1 | 12/2009 | Shimizu et al. | |
| 2010/0052632 | A1 | 3/2010 | Wu | |
| 2012/0086416 | A1 * | 4/2012 | Kudo | H02M 3/1584 323/265 |
| 2012/0086418 | A1 * | 4/2012 | Lee | H02M 1/36 323/272 |
| 2012/0176105 | A1 | 7/2012 | Chang et al. | |
| 2013/0088899 | A1 | 4/2013 | Iwata | |
| 2013/0293203 | A1 | 11/2013 | Chen et al. | |
| 2014/0239934 | A1 | 8/2014 | Zhang | |
| 2015/0077072 | A1 * | 3/2015 | Yu | H02M 3/1584 323/271 |
| 2015/0085540 | A1 * | 3/2015 | Huang | H02M 3/33523 363/56.11 |
| 2015/0145490 | A1 | 5/2015 | Hang et al. | |
| 2015/0256067 | A1 * | 9/2015 | Bayer | H02M 1/08 323/282 |
| 2016/0172965 | A1 * | 6/2016 | Suryanarayana | H02M 3/156 323/234 |

* cited by examiner

MULTI-PHASE PARALLEL CONVERTER AND CONTROLLING METHOD THEREFOR

RELATED APPLICATIONS

This application is a continuation of the following application, U.S. patent application Ser. No. 14/967,798, filed on Dec. 14, 2015, and which is hereby incorporated by reference as if it is set forth in full in this specification, and which also claims the benefit of Chinese Patent Application No. 201510021774.7, filed on Jan. 16, 2015, which is incorporated herein by reference in its entirety.

FIELD OF THE INVENTION

The present disclosure generally relates to the field of power electronics, and more particularly to multi-phase parallel converters and associated controlling methods.

BACKGROUND

A switching power supply may typically include a power stage circuit and a control circuit. The control circuit can be used to regulate on and off times of a power switch in a switch-type converter based on variations of an input voltage, various internal parameters, and a load, so as to maintain an output voltage or an output current of the switching power supply as substantially constant. Therefore, control approaches are very important to the design of a switching power supply, and may affect the performance thereof. Different power supply results may be achieved with different detection signals and/or different control circuits.

SUMMARY

In one embodiment, a multi-phase parallel converter can include: (i) a plurality of sampling circuits corresponding to a plurality of power stage circuits to form a plurality of phases of the multi-phase parallel converter, where each of the plurality of sampling circuits is configured to sample an inductor current of a corresponding of the plurality of power stage circuits, and to generate a sense signal; (ii) a current-sharing circuit configured to generate a current-sharing control signal according to a superimposed signal, where the superimposed signal is generated by adding the sense signal to a bias voltage signal; (iii) a plurality of switching control circuits corresponding to the plurality of power stage circuits, where each of the plurality of switching control circuits is configured to receive the current-sharing control signal, and to control a switching operation of a corresponding of the plurality of power stage circuits; and (iv) a bias voltage generator configured to generate the bias voltage signal to gradually increase when a selected of the plurality of phases is to be disabled such that an output current of the selected phase is decreased to zero, and to generate the bias voltage signal to gradually decrease when the selected phase is to be enabled such that the output current of the selected phase is equal to output currents of remaining of the plurality of phases.

In one embodiment, a method of controlling a multi-phase parallel converter, can include: (i) sampling, by each of a plurality of sampling circuits corresponding to a plurality of power stage circuits forming a plurality of phases of the multi-phase parallel converter, an inductor current of a corresponding of the plurality of power stage circuits, and generating a sense signal; (ii) generating, by a current-sharing circuit, a current-sharing control signal according to a superimposed signal, where the superimposed signal is generated by adding the sense signal to a bias voltage signal; (iii) controlling, by each of a plurality of switching control circuits, a switching operation of a corresponding of the plurality of power stage circuits according to the current-sharing control signal; (iv) generating, by a bias voltage generator, the bias voltage signal to gradually increase when a selected of the plurality of phases is to be disabled such that an output current of the selected phase is decreased to zero; and (v) generating, by the bias voltage generator, the bias voltage signal to gradually decrease when the selected phase is to be enabled such that the output current of the selected phase is equal to output currents of remaining of the plurality of phases.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In the field of switching power supplies, multiple phases can be connected in parallel with interleaved control, in order to minimize the output filter inductor of a buck-type converter. Each phase can include a power switch and a corresponding filter inductor, and the outputs of the phases can connect to a common output filter capacitor. With such a multi-phase parallel structure, the current that should be provided by a single-phase converter can instead be provided by a multi-phase converter, which can significantly reduce the current that is actually provided by each phase.

In some applications (e.g., relatively low load current), a certain phase of a multi-phase converter may need to be turned off, in order to reduce switching power losses, and to improve system efficiency. Further, some stopped or disabled phases may then need to be turned back on when the load current is increased from such a relatively low value. However, if such phases are to be directly turned off or turned on, the output voltage may jump suddenly, which may result in damage to the load.

Figure 1A:
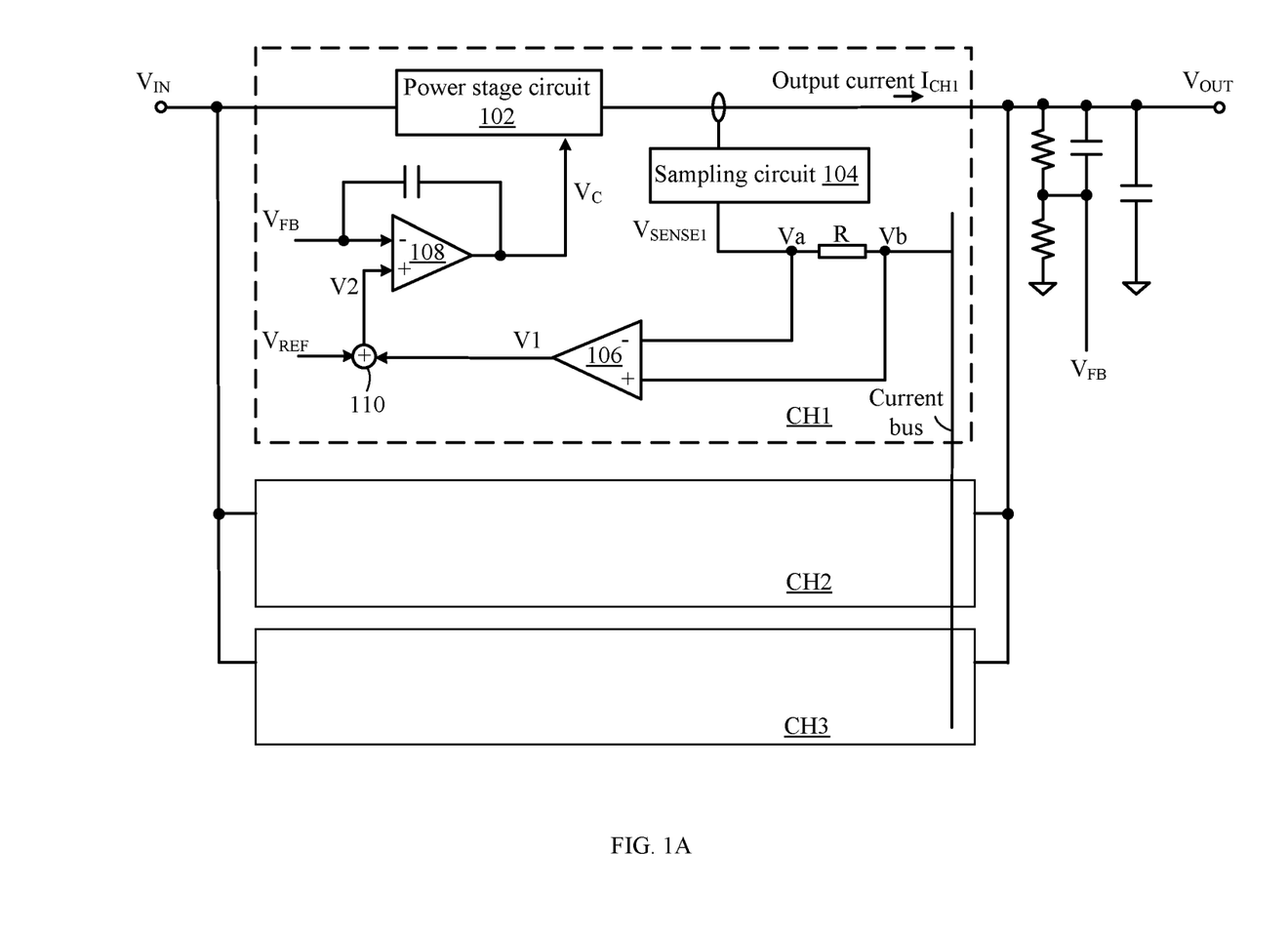
FIG. 1A is schematic block diagram of an example multi-phase parallel converter.

Referring now to FIG. 1A, shown is schematic block diagram of an example multi-phase parallel converter. In this particular example, three phases may be denoted by CH1, CH2, and CH3, and any number of such phases can be accommodated, along with a current-sharing circuit. Each phase (e.g., phase CH1) can include power stage circuit 102, sampling circuit 104, an error compensation circuit 106. The current-sharing circuit can include sampling circuits, error compensation circuits, and a current bus line. There may be a one-to-one correspondence between the sampling circuits, the error compensation circuits, and the power stage circuits. Each sampling circuit 104 can sense an inductor current of a corresponding power stage circuit 102, and may generate sense signal $V_{SENSE1}$ that represents the inductor current. Resistor R can connect to the current bus, and may have one terminal that receives sense signal $V_{SENSE1}$. For example, the voltage at the current bus may be a weighted value of the phases, and $V_a$ and $V_b$ can represent voltages at the opposite terminals of resistor R, where $V_b$ is the voltage at the terminal connected to the current bus.

Each error compensation circuit 106 may receive voltages $V_a$ and $V_b$, and can generate current-sharing control signal V1 by amplifying and compensating the difference between voltages $V_a$ and $V_b$. Each switching control circuit can receive a corresponding current-sharing control signal V1 to accordingly control the switching operation of a power switch in one power stage circuit 102. For example, each switching control circuit can include error amplifying circuit 108 and superimpose circuit 110. Superimpose circuit 110 (e.g., a summation circuit) can receive current-sharing control signal V1 and reference voltage signal $V_{REF}$, and may generate voltage signal V2. Error amplifying circuit 108 may have a noninverting input terminal to receive voltage signal V2, and an inverting input terminal to receive output voltage feedback signal $V_{FB}$ of the multi-phase parallel converter, and may generate switch control signal $V_c$ by amplifying and compensating the difference between V2 and $V_{FB}$. In this way, error amplifying circuit 108 can control the switching operation of the power switch in one power stage circuit 102, so as to control output current $I_{CH1}$ of this power stage circuit.

For example, current-sharing control signal V1 of one phase may increase when the output current of one phase is less than that of another phase, which may lead sense signal $V_{SENSE1}$ of this phase to be relatively low (e.g., $V_a < V1$). Thus, voltage signal V2, which is the sum of current-sharing control signal V1 and reference voltage signal $V_{REF}$, may also increase along with switch control signal $V_c$, so as to increase the output current of this phase. Finally, the output currents of all phases may be balanced after regulation.

Figure 1B:
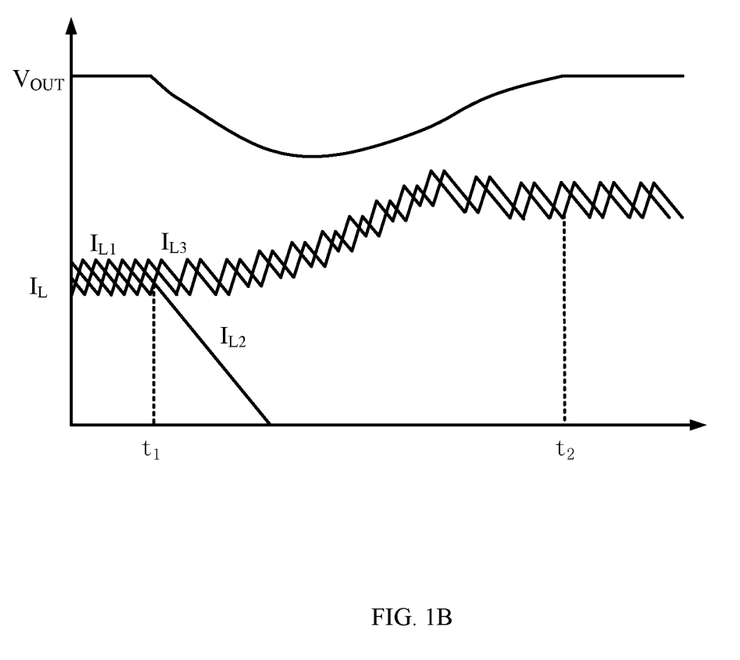
FIG. 1B is a waveform diagram of a first example operation of a multi-phase converter with one phase to be turned off.

Referring now to FIG. 1B, shown is a waveform diagram of a first example operation of a multi-phase converter with one phase to be turned off. The output voltage may jump when one phase is to be turned off or restarted again. As shown, $V_{OUT}$ is the output voltage of the multi-phase parallel converter, and $I_{L1}$, $I_{L2}$, and $I_{L3}$ represent inductor currents of the first, second, and third phases, respectively. When one phase is to be turned off, such as the second phase at time $t_1$, the inductor current of the second phase may quickly decrease to zero. As a result, output voltage $V_{OUT}$ of the multi-phase converter may significantly drop, and the currents of the first and third phases may increase in order to meet load requirements. Thus, output voltage $V_{OUT}$ may gradually increase until recovering to a stable value at time $t_2$.

Figure 1C:
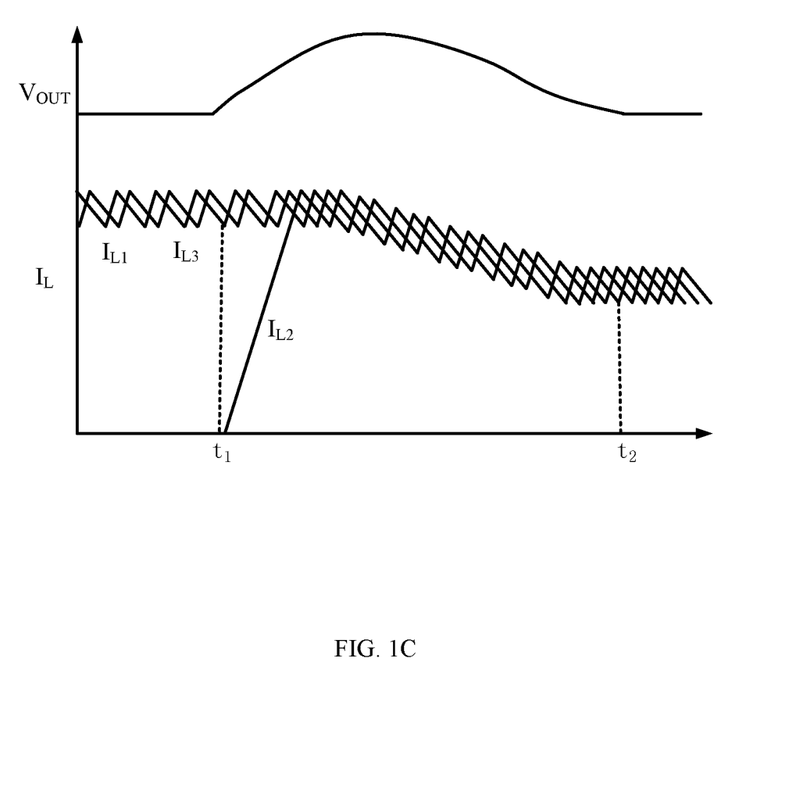
FIG. 1C is a waveform diagram of a second example operation of a multi-phase converter with one phase to be restarted.

Referring now to FIG. 1C, shown is a waveform diagram of a second example operation of a multi-phase converter with one phase to be restarted. Here, $V_{OUT}$, $I_{L1}$, $I_{L2}$, and $I_{L3}$ may represent the same physical quantities as in FIG. 1B. In this particular example, when one phase is to be restarted (e.g., the second phase at time $t_1$), the inductor current of the second phase may quickly increase. As a result, output voltage $V_{OUT}$ of the multi-phase converter may significantly increase, and the currents of the first and third phases may decrease in order to meet the load requirements. Output voltage $V_{OUT}$ may gradually decrease until recovering to a stable value at time $t_2$. However, the output voltage jumping in these examples due to the turn off/on of one phase can potentially damage the load or circuit in some cases.

In one embodiment, a multi-phase parallel converter can include: (i) a plurality of sampling circuits corresponding to a plurality of power stage circuits to form a plurality of phases of the multi-phase parallel converter, where each of the plurality of sampling circuits is configured to sample an inductor current of a corresponding of the plurality of power stage circuits, and to generate a sense signal; (ii) a current-sharing circuit configured to generate a current-sharing control signal according to a superimposed signal, where the superimposed signal is generated by adding the sense signal to a bias voltage signal; (iii) a plurality of switching control circuits corresponding to the plurality of power stage circuits, where each of the plurality of switching control circuits is configured to receive the current-sharing control signal, and to control a switching operation of a corresponding of the plurality of power stage circuits; and (iv) a bias voltage generator configured to generate the bias voltage signal to gradually increase when a selected of the plurality of phases is to be disabled such that an output current of the selected phase is decreased to zero, and to generate the bias voltage signal to gradually decrease when the selected phase is to be enabled such that the output current of the selected phase is equal to output currents of remaining of the plurality of phases.

Figure 2A:
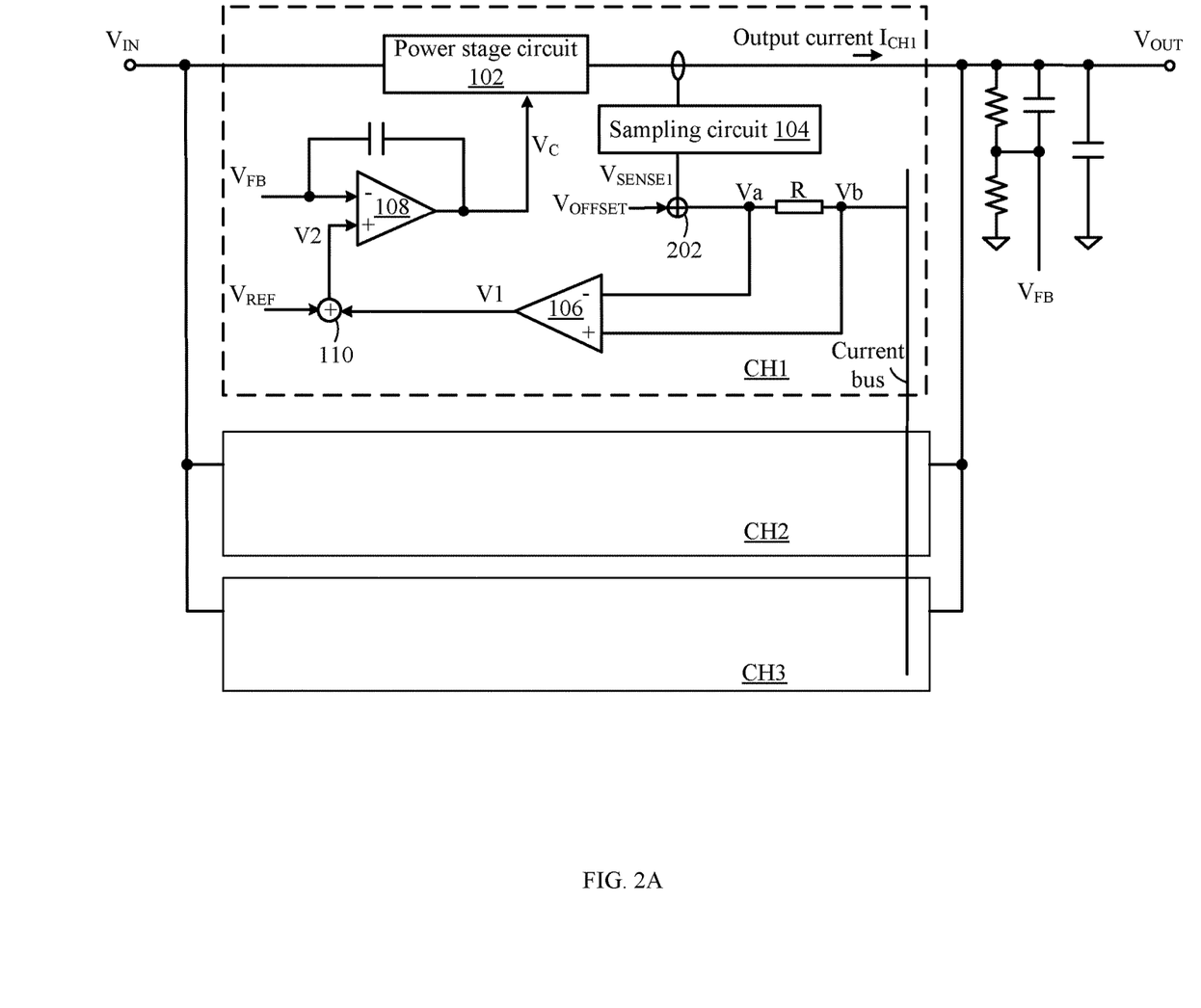
FIG. 2A is schematic block diagram of an example multi-phase converter, in accordance with embodiments of the present invention.
Figure 2B:
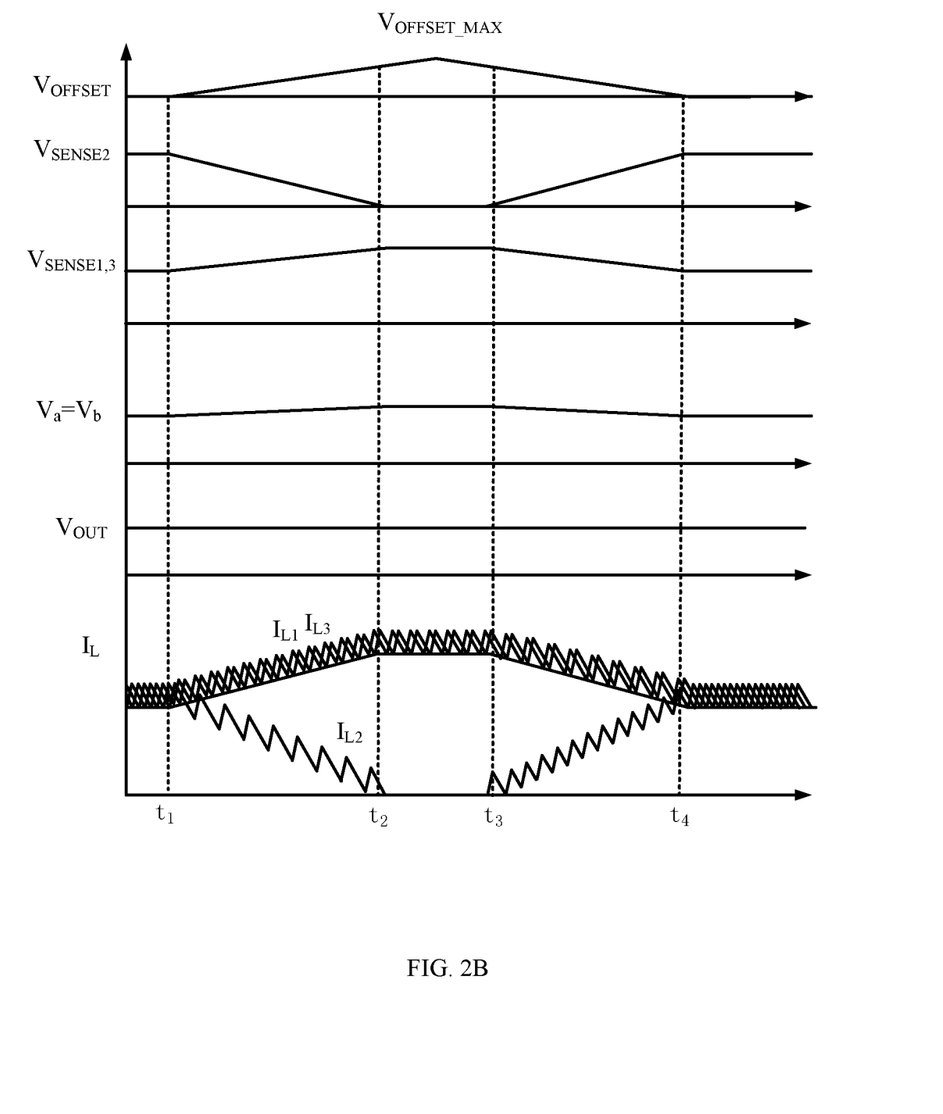
FIG. 2B is a waveform diagram of a first example operation of a multi-phase converter switching with one phase to be turned off, in accordance with embodiments of the present invention.

Referring now to FIG. 2A, shown is schematic block diagram of an example multi-phase converter, in accordance with embodiments of the present invention. Also, FIG. 2B, shows a waveform diagram of a first example operation of a multi-phase converter switching with one phase to be turned off, in accordance with embodiments of the present invention. In certain embodiments, a sense signal can be regulated to avoid output voltage jumping due to the turning off (disabling) or restarting (enabling) of one phase of the multi-phase parallel converter. In FIG. 2, a three-phase parallel converter can include a plurality of power stage circuits 102, a plurality of switching control circuits, and a current-sharing circuit, as described above.

In particular embodiments, the current-sharing circuit can include a plurality of sampling circuits 104 that have a one-to-one correspondence with a plurality of power stage circuits 102. Each sampling circuit 104 can sample the inductor current of a corresponding power stage circuit 102, and may generate sense signal $V_{SENSE1}$. A superimposed signal (e.g., $V_a$) can be generated by adding (e.g., via superimpose or summation circuit 202) bias voltage signal $V_{OFFSET}$ with sense signal $V_{SENSE1}$. The current-sharing circuit can then generate (e.g., via 106) current-sharing control signal V1 according to the superimposed signal. Each switching control circuit can receive a corresponding current-sharing control signal V1, in order to control the switching operation of a power switch in one power stage circuit 102, so as to regulate output current $I_{CH1}$ of this power stage circuit.

Figure 3:
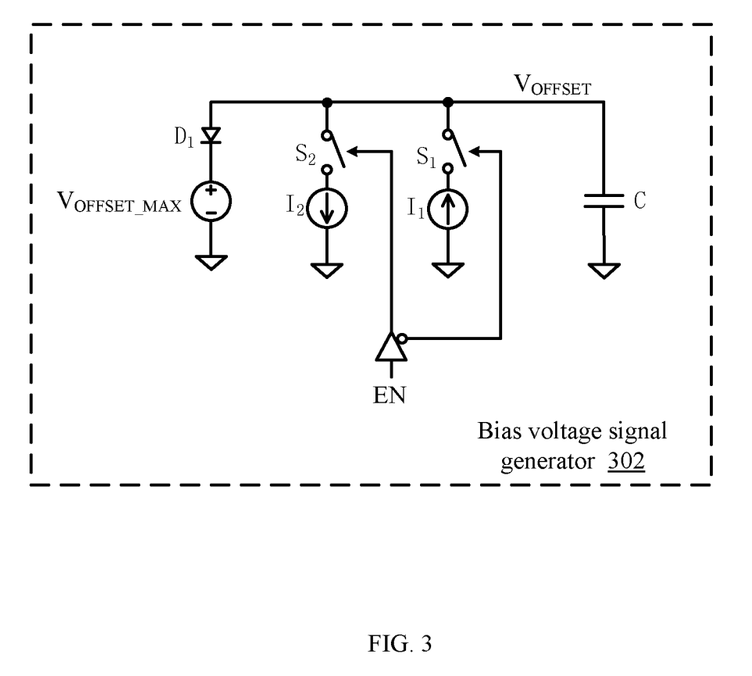
FIG. 3 is schematic block diagram of an example bias voltage signal generator, in accordance with embodiments of the present invention.

Referring now to FIG. 3, shown is schematic block diagram of an example bias voltage signal generator, in accordance with embodiments of the present invention. For example, each phase/channel (e.g., CH1, CH2, CH3, etc.) can include an instance of bias voltage signal generator 302. Bias voltage signal generator 302 can generate bias voltage signal $V_{OFFSET}$, and may include current sources $I_1$ and $I_2$ and bias capacitor C coupled in parallel. Current source $I_1$ can connect to switch $S_1$, current source $I_2$ can connect to switch $S_2$, and switches $S_1$ and $S_2$ may be controlled by enable signal EN. For example, switch $S_1$ may be controlled by an inverted version of the enable signal, and switch $S_2$ can be controlled by the enable signal. Bias voltage generator can also include diode $D_1$ with an anode connected to one terminal of bias capacitor C, and a cathode connected to one terminal of a voltage source. The other terminal of the voltage source can connect to ground, and the voltage source may provide maximum value $V_{OFFSET\_MAX}$ of bias voltage signal $V_{OFFSET}$.

Switch $S_1$ can be turned on according to enable signal EN when one phase of the multi-phase parallel converter is to be turned off. Current source $I_1$ can then charge bias capacitor C, and the voltage across bias capacitor C (e.g., bias voltage signal $V_{OFFSET}$) can gradually increase, so the output current of this phase may be gradually decreased to zero. Switch $S_2$ can be turned on according to the enable signal when one phase of the multi-phase parallel converter is to be restarted again. In this case, bias capacitor C can be discharged by current source $I_2$, and bias voltage signal $V_{OFFSET}$ may gradually decrease, so the output of this phase may gradually be increased to be equal to the output currents of the remaining phases.

In particular embodiments, a clamp circuit can include diode $D_1$ and a voltage source configured to clamp bias voltage signal $V_{OFFSET}$ so that bias voltage signal generator 302 can be used in heavy-load condition. For example, when bias voltage signal $V_{OFFSET}$ is increased to maximum value $V_{OFFSET\_MAX}$ over time by charging bias capacitor C, bias voltage signal $V_{OFFSET}$ may be maintained at a diode drop above maximum value $V_{OFFSET\_MAX}$. The output current may remain substantially zero when the bias voltage signal is decreased to the voltage at the current bus by discharging bias capacitor C, and the output current of the restarted phase can be equal to that of the remaining phases when bias voltage signal $V_{OFFSET}$ is decreased over time to zero. As those skilled in the art will recognize, a lower clamp circuit (e.g., a zener diode) may be connected in parallel to bias capacitor C in order to avoid possible negative voltage across the bias capacitor, such that the minimum value of the bias voltage signal is zero.

As shown in FIG. 2B, at time $t_1$, the second phase can be turned off, and bias voltage signal $V_{OFFSET}$ in the current-sharing circuit of the second phase may linearly increase over time. According to principles of a current-sharing circuit, $V_a=V_b$ when the current-sharing loop is in a stable state while the voltage at one terminal of resistor R is $V_a=V_{OFFSET}+V_{SENSE2}$, so a lower sense voltage $V_{SENSE2}$ may be required in order to obtain a stable current loop due to the increase of bias voltage signal $V_{OFFSET}$. The larger/higher bias voltage signal $V_{OFFSET}$ is, the smaller sense signal $V_{SENSE2}$ may become. Also, sense signal $V_{SENSE2}$ may be decreased to zero when bias voltage signal $V_{OFFSET}$ reaches $V_a$ at time $t_2$, so the output current of this phase can be zero. The off state of the second phase may be completed at this time, and inductor currents $I_{L1}$ and $I_{L3}$ of the first and third phases may gradually increase along with sense signals $V_{SENSE1}$ and $V_{SENSE3}$, and output voltage $V_{OUT}$ of the multi-phase parallel converter may be substantially constant.

Also, in the example of FIG. 2B, if one phase is to be restarted (enabled) during the operation, bias voltage signal $V_{OFFSET}$ of the second phase may be preset or initialized as $V_{OFFSET\_MAX}$, whereby the second phase is to be restarted at time $t_3$. For example, $V_{OFFSET\_MAX}$ should be large enough such that the output current of the phase is initially zero. In such a case, sense voltage $V_{SENSE2}$ can be zero, and bias voltage signal $V_{OFFSET\_MAX}$ should be an appropriate value such that the output current of the second phase may be substantially equal to the output currents of the remaining phases (e.g., first and second phases) when bias voltage signal $V_{OFFSET}$ is decreased over time to zero. For example, at time $t_3$, when bias voltage signal $V_{OFFSET}$ is decreased over time, the output current of the second phase may increase due to the regulation of the current-sharing loop.

Sense signal $V_{SENSE2}$ may accordingly increase, and when bias voltage signal $V_{OFFSET}$ is reduced to zero, the output current of the second phase may be substantially equal to the output currents of the remaining phases by the time restarting of the second phase is completed. It can be seen from FIG. 2B that inductor currents $I_{L1}$ and $I_{L3}$ of the first and third phases may gradually decrease, as well as sense signals $V_{SENSE1}$ and $V_{SENSE3}$, and output voltage $V_{OUT}$ of the multi-phase parallel converter may be substantially constant. In this way, the state (enabled or disabled) of one phase of the multi-phase parallel converter can be smoothly changed by adding a variable bias voltage signal (e.g., $V_{OFFSET}$) to the sense signal. Therefore, the output voltage jump caused by turning off (disabling) or restarting (enabling) one phase can be substantially eliminated.

Any suitable current-sharing circuit can be employed in certain embodiments, such as any circuit whereby a bias voltage signal is added to a sense signal that represents an inductor current of e.g., a second or third phase. Further, the sense signal (e.g., $V_{SENSE1}$) can be decreased (or increased) when the bias voltage signal (e.g., $V_{OFFSET}$) is increased (or decreased), such that the output current of the corresponding phase (e.g., $I_{CH1}$) may be accordingly decreased (or increased). In this way, the enabling or disabling of the given phase (e.g., CH1) can be changed in a relatively smooth fashion.

In one embodiment, a method of controlling a multi-phase parallel converter, can include: (i) sampling, by each of a plurality of sampling circuits corresponding to a plurality of power stage circuits forming a plurality of phases of the multi-phase parallel converter, an inductor current of a corresponding of the plurality of power stage circuits, and generating a sense signal; (ii) generating, by a current-sharing circuit, a current-sharing control signal according to a superimposed signal, where the superimposed signal is generated by adding the sense signal to a bias voltage signal; (iii) controlling, by each of a plurality of switching control circuits, a switching operation of a corresponding of the plurality of power stage circuits according to the current-sharing control signal; (iv) generating, by a bias voltage generator, the bias voltage signal to gradually increase when a selected of the plurality of phases is to be disabled such that an output current of the selected phase is decreased to zero; and (v) generating, by the bias voltage generator, the bias voltage signal to gradually decrease when the selected phase is to be enabled such that the output current of the selected phase is equal to output currents of remaining of the plurality of phases.

In particular embodiments, a method of controlling a multi-phase parallel converter that includes a plurality of power stage circuits, a plurality of switching control circuits with one-to one correspondence with the power stage circuits, and a current-sharing circuit, can include sampling (e.g., via sampling circuit 104) the inductor current of each of the power stage circuits (e.g., 102) to obtain a sense signal (e.g., $V_{SENSE1}$). A bias voltage signal (e.g., $V_{OFFSET}$) can be added (e.g., via 202) with the sense signal to generate a superimposed signal (e.g., $V_a$). A current-sharing control signal (e.g., V1) can be generated (e.g., via 106) according to the superimposed signal. A switch control signal (e.g., $V_c$) can be generated (e.g., via 108 and 110) from the current-sharing control signal and an output voltage feedback signal (e.g., $V_{FB}$) of the multi-phase parallel converter. The switch control signal can be utilized to control the switching operation of a corresponding power stage circuit (e.g., 102).

When one phase of the multi-phase parallel converter is to be turned off (disabled), the bias voltage signal of such phase can be increased over time until the corresponding output current is decreased to zero. When one phase of the multi-phase parallel converter is to be restarted (enabled), the bias voltage signal of such phase can be decreased over time until the corresponding output current is equal to the output currents of the remaining phases. For example, the corresponding output current can be equal to the output currents of the remaining phases when the bias voltage signal is decreased to zero.

Furthermore, the bias voltage signal can be generated by charging a bias capacitor (e.g., C) by a first current source (e.g., $I_1$) to increase the bias voltage signal over time when one phase of the multi-phase parallel converter is to be turned off. The bias capacitor can be discharged by a second current source (e.g., $I_2$) to decrease the bias voltage signal over time when one phase of the multi-phase parallel converter is to be restarted. Moreover, the bias voltage signal may be clamped to an upper clamping signal (e.g., $V_{OFFSET\_MAX}$) when the bias capacitor is charged to the upper clamping signal by the first current source.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of controlling a multi-phase parallel converter having a plurality of power stage circuits, the method comprising:
    a) determining whether each of said plurality of power stage circuits is needed to provide power to a load in accordance with a state of said load;
    b) decreasing an output current of one of said power stage circuits by generating a bias voltage signal to gradually increase during a first time period in accordance with a current sharing control when there is no need for said power stage circuit to provide power to said load, wherein said bias voltage signal is generated independently of an output voltage of said multi-phase parallel converter;
    c) increasing said output current of one of said power stage circuits by generating said bias voltage signal to gradually decrease during a second time period in accordance with said current sharing control if said power stage circuit is needed to provide power to said load; and
    d) wherein said current sharing control comprises using a current bus signal that is coupled to each of said plurality of power stage circuits, and using a superimposed signal by adding said bias voltage signal to a sense signal representing said output current of said power stage circuit.

2. The method of claim 1, further comprising increasing said output current from zero until said output currents of said power stage circuits are consistent with each other.

3. The method of claim 1, further comprising decreasing said output current to zero to disable said power stage circuit.

4. The method of claim 1, further comprising gradually increasing said output currents of remaining of said plurality of power stage circuits when said output current of one of said power stage circuits is gradually decreased.

5. The method of claim 1, further comprising gradually decreasing said output currents of remaining of said plurality of power stage circuits when said output current of one of said power stage circuits is gradually increased.

6. The method of claim 1, further comprising generating said current bus signal by a weighted calculation of said output currents.

7. The method of claim 1, wherein said current sharing control is in accordance with an error between said current bus signal and said superimposed signal.

8. The method of claim 1, further comprising controlling said bias voltage signal to be gradually increased by a bias voltage generator, in order to decrease said output current of said power stage circuit.

9. The method of claim 1, further comprising controlling said bias voltage signal to be gradually decreased by a bias voltage generator, in order to increase said output current of said power stage circuit.

10. The method of claim 1, wherein said gradually increasing said bias voltage signal comprises linearly increasing said bias voltage signal.

11. The method of claim 1, wherein said gradually decreasing said bias voltage signal comprises linearly decreasing said bias voltage signal.

12. The method of claim 1, wherein said gradual increase of said bias voltage signal is symmetrical to said gradual decrease of said bias voltage signal.

* * * * *